Dec. 4, 1962 F. J. CHATAGNIER 3,066,469
ASPARAGUS HARVESTER
Filed June 30, 1961 4 Sheets-Sheet 1
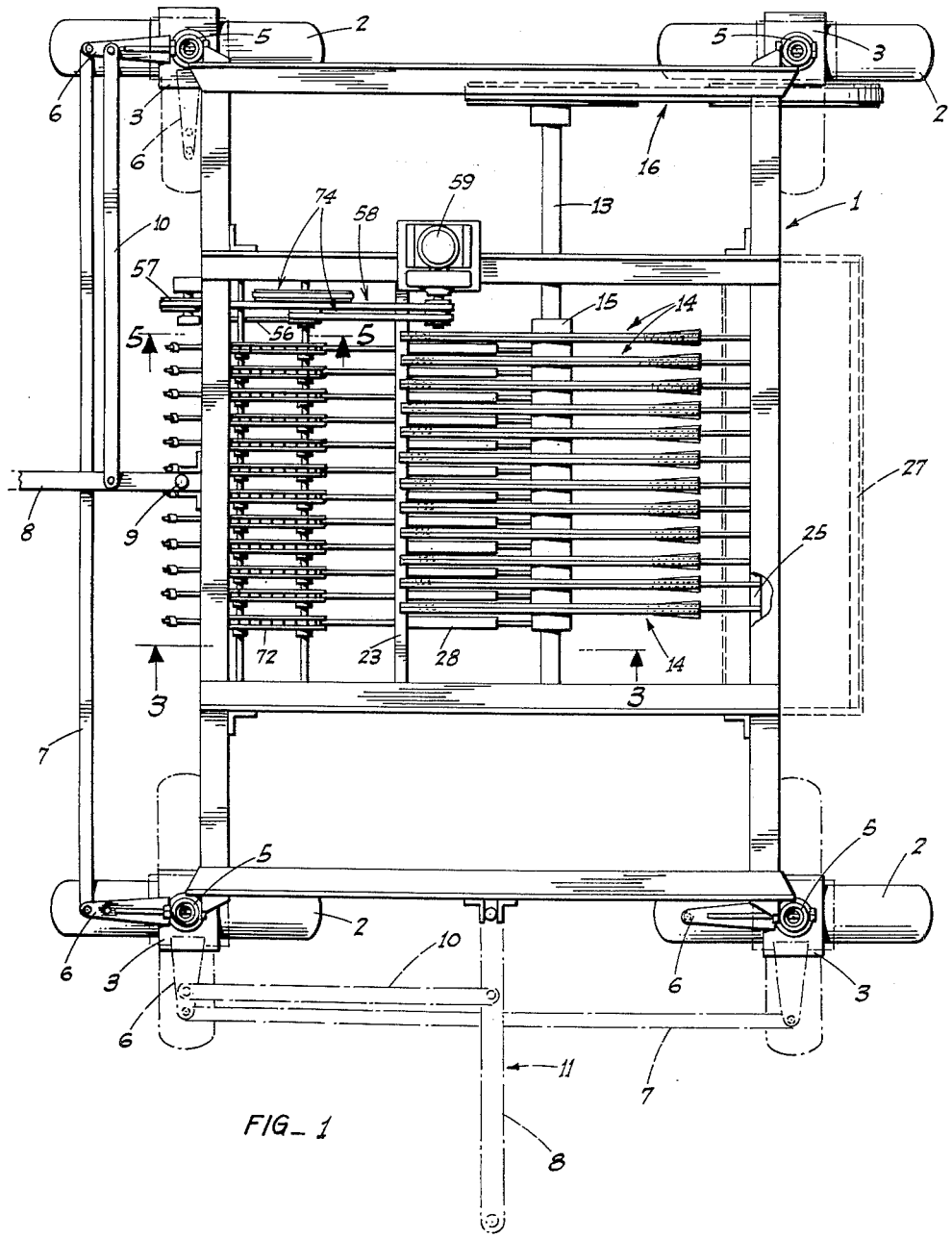
FIG_1
INVENTOR.
FRANCIS J. CHATAGNIER
BY
Webster & Webster
ATTORNEYS Dec. 4, 1962 F. J. CHATAGNIER 3,066,469
ASPARAGUS HARVESTER
Filed June 30, 1961 4 Sheets-Sheet 2
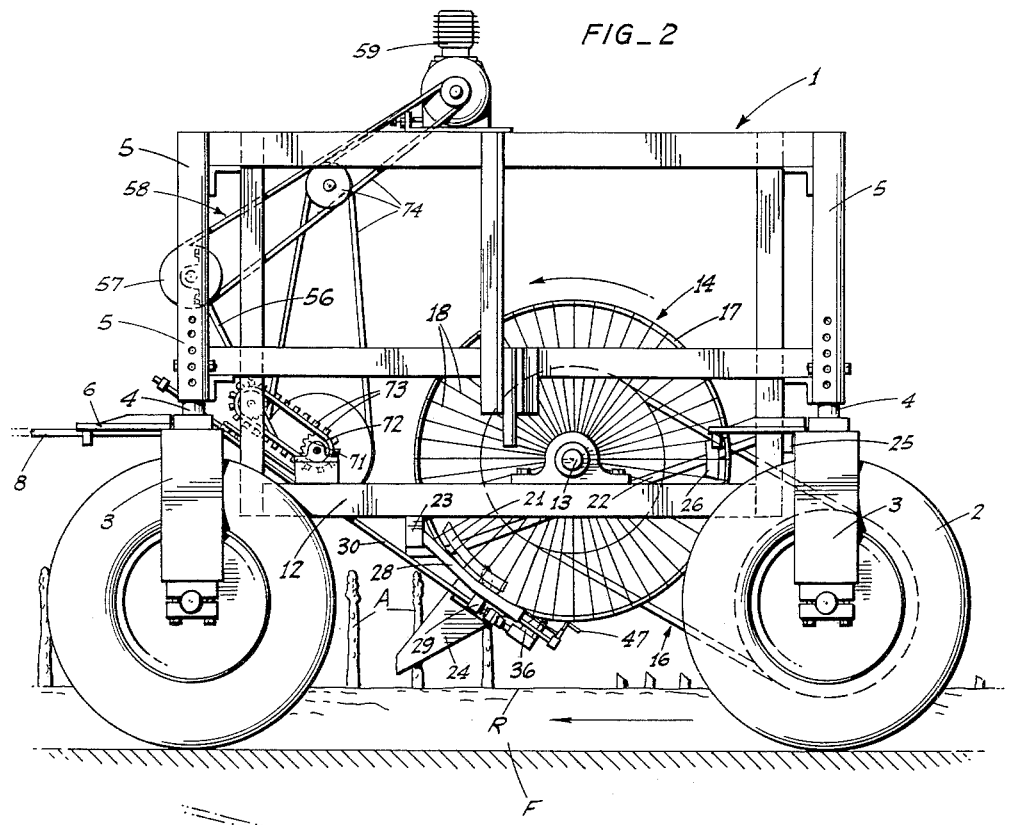
FIG_2
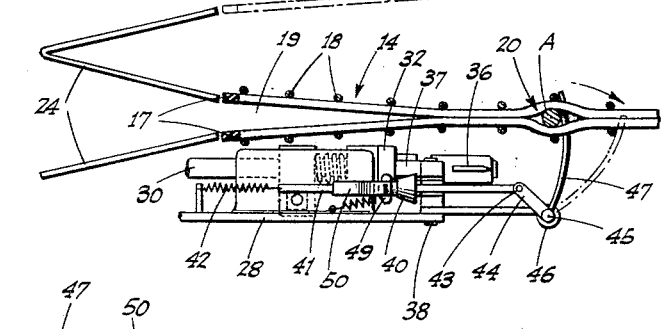
FIG_7
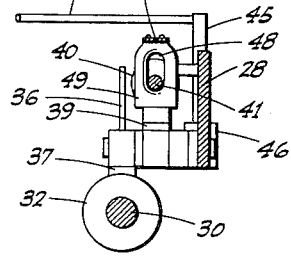
FIG_8
INVENTOR.
FRANCIS J. CHATAGNIER
BY
Webster & Webster
ATTORNEYS

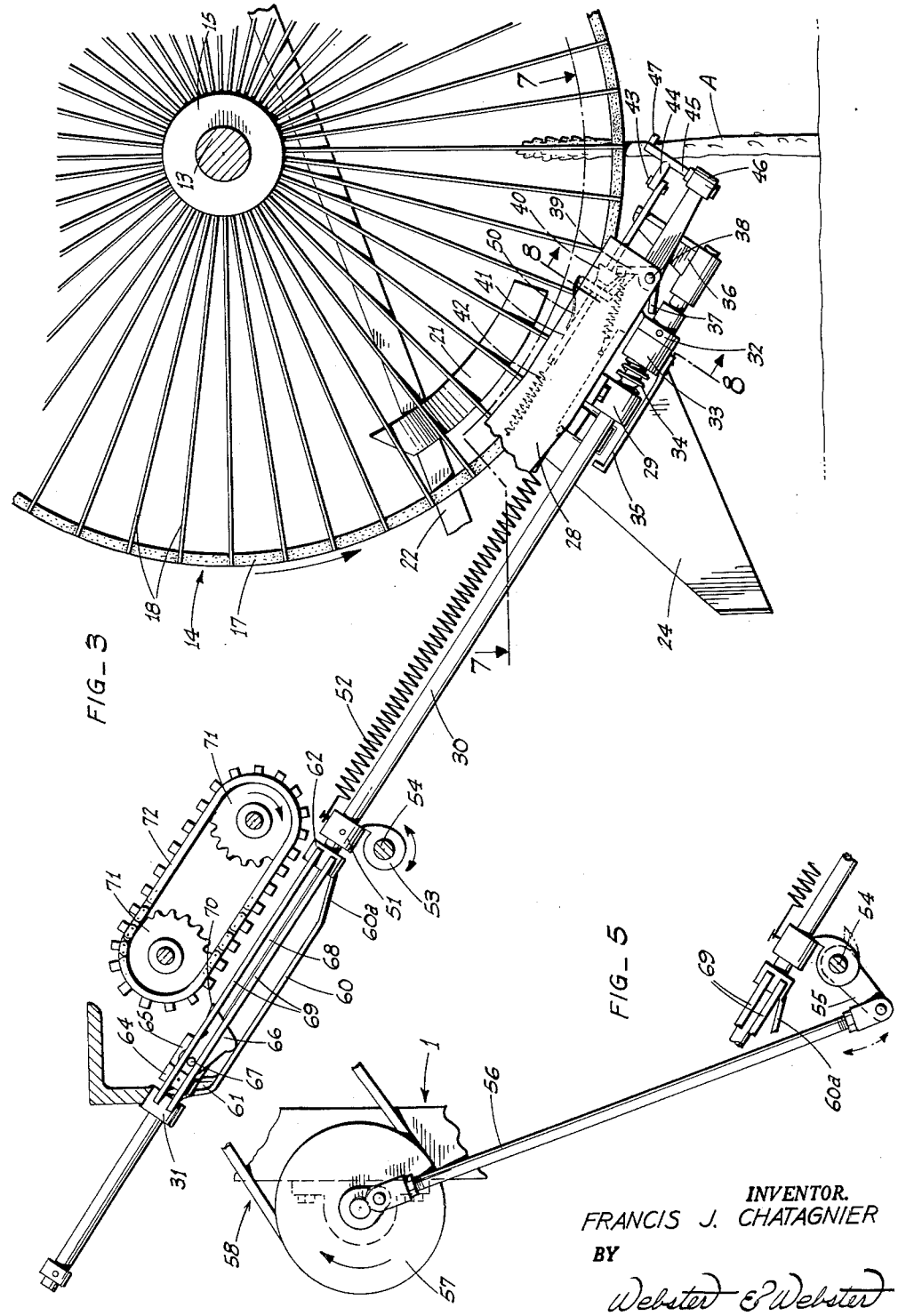

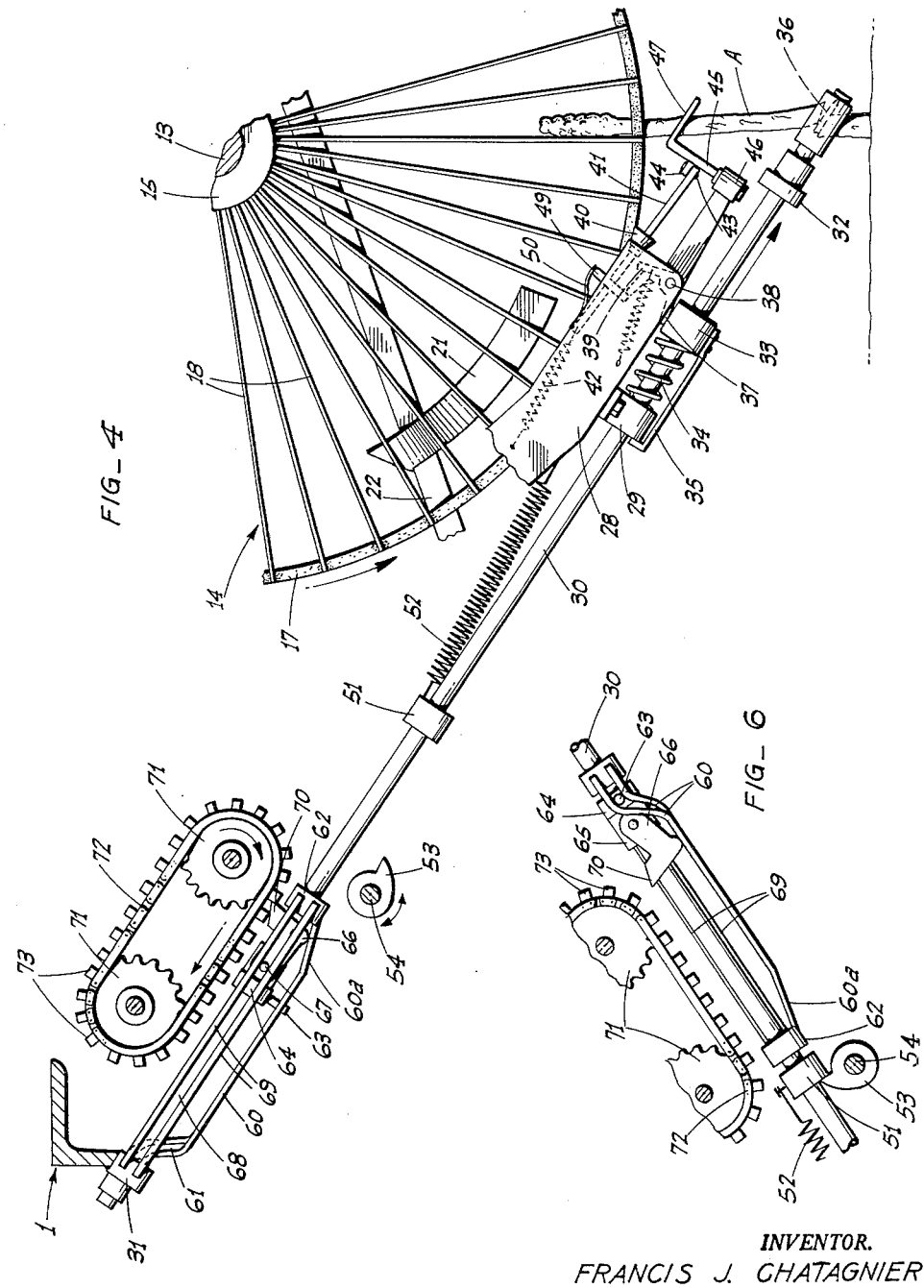

United States Patent Office 3,066,469
Patented Dec. 4, 1962

3,066,469
ASPARAGUS HARVESTER
Francis J. Chatagnier, 5 E. 13th St., Antioch, Calif.
Filed June 30, 1961, Ser. No. 121,211
13 Claims. (Cl. 56—327)

This invention relates to produce harvesting machines; the major object of my invention being to provide a machine particularly designed to harvest green or aboveground asparagus, as distinguished from the white or below-ground stalks.

Asparagus is commonly planted in transversely spaced ridged rows, each row—at harvesting time—presenting upstanding stalks of different heights and disposed without any particular spacing or alinement either lengthwise or transversely of the ridge or row.

Another object of my invention therefore is to provide a machine for the purpose which, with a single pass along the ridge, will harvest practically all the stalks of a predetermined harvestable height, while leaving undisturbed any stalks of a lesser height and not yet fully grown.

The machine includes a group of wheels disposed in somewhat closely spaced transverse alinement and in a number sufficient to extend the full width of a ridge or row; and another object of this invention is to construct and arrange each wheel so that it will successively engage and grip stalks in its path, and to provide a knife mounted in cooperative relation with each wheel to cut through any stalks in its path, and controlled so that it will only function if such stalk is gripped by the related wheel.

In connection with the above feature, another object of the invention is to mount and control the knife so that any gripped stalk will be cut through close to the ground, and the knife will then be instantly retracted so that it will not be in the way of any shorter stalks or others not yet gripped, but which would otherwise be in the path of the knife as the machine moves along the row.

Still another object of the invention is to arrange each wheel so that all gripped stalks, after being cut, will be lifted a certain distance and will then be automatically released and allowed to fall into a carry-off conveyor or catch receptacle mounted on or connected to the machine.

It is also an object of the invention to provide a practical, reliable, and durable asparagus harvester, and one which will be exceedingly effective for the purpose for which it is designed.

These objects are accomplished by means of such structure and relative arrangement of parts as will fully appear by a perusal of the following specification and claims.

In the drawings:

FIG. 1 is a somewhat diagrammatic plan of the asparagus cutting machine as arranged to cut all the asparagus stalks in a single field row or ridge.

FIG. 2 is a side elevation of the machine as in operation.

FIG. 3 is a fragmentary enlarged elevation of one of the asparagus gripping wheels of the machine showing the stalk-controlled cutting mechanism associated therewith, with the control finger as initially engaging an upstanding stalk, and taken on line 3—3 of FIG. 1.

FIG. 4 is a similar view, but showing the knife cutting through the stalk after the release of said knife by the control finger.

FIG. 5 is a fragmentary enlarged side elevation showing the reciprocating mechanism for the knife-mounting shaft, taken on line 5—5 of FIG. 1.

FIG. 6 is a fragmentary side elevation of the knife-shaft retracting and oscillating unit, looking at the side thereof opposite that depicted in FIG. 4.

FIG. 7 is a fragmentary sectional plan, taken substantially on line 7—7 of FIG. 3.

FIG. 8 is a fragmentary enlarged cross section, taken on line 8—8 of FIG. 3.

Referring now more particularly to the drawings, and to the characters of reference marked thereon, the machine comprises a rigid upstanding frame structure, indicated generally at 1. This frame is supported at its corners by wheels 2. Each wheel is mounted in a yoke 3 having an upstanding spindle 4 slidably and adjustably mounted in a sleeve 5 rigid with the frame 1. The yokes of the pair of wheels at the front of the machine are provided with forwardly projecting arms 6 connected by a tie rod 7. A drawbar 8 is pivotally connected to the frame, as at 9, and to one of the arms by a steering link 10 so that upon swinging of the drawbar to one side or the other, the wheels will be steered.

The machine, when made for multiple row service, is considerably wider than it is long. To enable the machine to be towed along a road with the width of the machine extending lengthwise of such road, the drawbar, tie rod, and steering link are arranged to be detached from their normal position, and connected to one front wheel and to the adjacent normally disposed rear wheel, as indicated at 11 in FIG. 1. The front and rear wheels in their normal positions are spaced transversely so as to straddle an asparagus ridge R and ride in the furrows F to the sides of the ridge.

The frame 1 includes transversely spaced horizontal beams 12, disposed some distance above the level of the ridge R and supporting the axle 13 of a group of asparagus gripping wheels of special form, and indicated generally at 14. These wheels are placed as close together as is practicable, and there are sufficient wheels to take care of all asparagus stalks as they may be transversely spaced in the ridge. The hubs 15 of all the wheels are fixed on the one axle 13, and said axle is driven at a speed to turn the wheels at the same linear speed as that of the advance of the machine by a conventional form of belt drive 16.

The wheels are disposed so that at the bottom they are closer to the top of the ridge R than the height of any asparagus stalks A to be cut, and projecting upwardly from the ridge as clearly shown. The wheels are all of identical form and each one comprises a pair of resilient rubber rim bands 17 which form the rim of the wheel. Laterally resilient metal spokes 18 radiating from the hub 15 to the bands 17 are secured against the laterally outer faces thereof. The spokes tend to maintain the rim bands 17 in close engagement with each other.

From a point on the rim of the wheel a short distance above the top level of any stalk A to a point adjacent the bottom center of the wheel, the bands are separated sufficiently to allow of the entry of a stalk A therebetween. The bands are then allowed to gradually come together again, as indicated at 19 in FIG. 7, so that such stalk, passing between the rim bands as the machine advances and the wheel rotates, is finally gripped by the bands, as indicated at 20.

Such separation of the bands is effected by means of a pair of circumferentially extending spoke-engaging cam or spreader strips 21 disposed between the two sets of spokes and supported by a bar 22. This bar at its forward end projects from the wheel through the opening between the bands 17 as formed by the spreaders, and at such end is secured to a cross beam 23 mounted on frame 1 above the level of any asparagus stalks.

Any asparagus stalk not directly in line with the opening 19 between the rim bands is engaged and bent laterally to the small extent necessary by forwardly diverging deflectors 24 supported just ahead of the spread portion of the wheel.

The bar 22 extends at an upward angle to and beyond the rim bands at the rear of the wheel and is there connected to another frame-mounted cross beam 25; the bar passing through the opening between the rim bands 17 formed by the spreading action of spoke-engaging cam strips 26 secured to bar 22. This spreading or separation of the rim bands, which takes place above the level of any growing asparagus, releases, a previously gripped and cut stalk and allows the same to drop onto a suitable conveyor or catch receptacle, indicated generally at 27. This conveyor is machine-mounted and is common to all the wheels thereon.

The firmly gripped stalk A is cut through near the ground by the following mechanism, which is repeated for each wheel of the series:

A mounting bracket 28 extends rearwardly from a connection with the cross beam 23 in laterally offset relation to the adjacent wheel 14. This bracket, underneath and intermediate its ends, supports a bearing 29 in which a longitudinally extending shaft 30 is slidable and turnable; said shaft being also laterally offset from the wheel.

Another frame-mounted bearing 31 supports the shaft relatively close to its upper end; said shaft sloping upwardly to its forward end, as shown.

A collar 32 is fixed on shaft 30 rearwardly of bearing 29; another collar 33, in which the shaft is turnable, being disposed between collar 32 and the bearing 29, with a compression spring 34 on the shaft between said collar 33 and the bearing 29. A catch finger 35 is secured on and projects forwardly from collar 33 to engage bearing 29 and limit rearward movement of said collar by the spring 34.

A knife 36 fixed on the rear end of shaft 30 extends radially thereof, being in a vertical position when not in operation. The knife is normally maintained in a forward or retracted position, and with the spring 34 compressed, by means of a forwardly and downwardly projecting spring-pressed pawl 37 pivoted on the bracket 28, as at 38, and engaging the collar 32 behind the same, as shown in FIG. 3.

To release the pawl so as to enable the shaft 30 and knife 36 thereon to move rearwardly to a stalk cutting position, another pawl 39 projects upwardly to one side of and in rigid relation with pawl 37. This pawl 39 normally engages behind a frusto-conical collar 40 fixed on a longitudinally extending rod 41 disposed between the bracket 28 and wheel 14, and of course above the shaft 30. The rod 41 is yieldably pulled forwardly by a spring 42 connected to the bracket and said rod.

At its rear end the rod 41 is flexibly connected, as at 43, to the outer end of an arm 44 fixed on an upstanding spindle 45 disposed at right angles to the rod 41 and projecting toward the wheel 14. The spindle 45 is turnable in a bearing 46 rigid with bracket 28 and disposed some distance rearwardly of the retracted position of the knife 36, as shown in FIG. 3.

Rigid with the upper end of the spindle 45 and projecting laterally at a level relatively close to and below the bottom of the wheel 14 is a feeler finger 47. The length of this finger is such that it will cross the path of a stalk A held and clamped by the wheel, so that said finger will engage such stalk from behind upon advance of the machine.

The rod 41, ahead of the collar 40, is guided for longitudinal movement as well as for upward and lateral swivel movement about the connection 43 as an axis, in the vertical slot 48 of a yoke 49, which—as here shown—may be supported from the pawl 39. A leaf spring 50 mounted on the yoke 49 above the rod 41 yieldably rides and presses down on said rod and holds the same at the bottom of slot 48.

Fixed on the shaft 30 at a point intermediate the bearings 29 and 31 is a collar 51; a normally extended tension spring 52 connecting the collar 51 and bracket 28. A constantly oscillating cam 53, fixed on a transverse axis, frame-mounted shaft 54, is driven at a relatively high speed, and turned through an arc sufficient to release the same from collar 51 at the limit of rearward rotation of said cam, by the following means:

Secured on shaft 54 is a short radial arm 55 (see FIG. 5). A pitman 56 extends from said arm to an eccentric short-stroke connection with a frame-mounted pulley 57. This pulley is part of a belt-drive unit, indicated generally at 58 (see FIG. 2) and which is driven from a gas engine 59 or similar power unit mounted on frame 1. The one pitman 56 and its drive actuates the single shaft 54 on which the cams 53 for the entire group of units are mounted.

From the above described structure and arrangement of parts it will be seen that as the machine advances and the finger 47 engages a held stalk A from behind, said finger will be swung rearwardly, since the stalk remains relatively stationary. Such movement of the finger causes the arm 44 to be turned to the rear. This pulls rearwardly on the rod 41, and the collar 40 thereon pulls back on the pawl 39.

Since the pawls 39 and 37 are fixed with each other, pawl 37 will be lifted from collar 32, releasing the same and the shaft for rearward movement. This enables the collars 32 and 33, as well as the shaft 30, to be immediately moved rearwardly under the impetus of the spring 34; the movement of the collar 33 being limited by the catch 35 so that pawl 37 will seat on said collar 33 and will remain in a released position regardless of further rearward movement of collar 40 and feeler 47 as the latter continues its swinging movement to clear the engaged stalk A, as indicated in FIG. 4. This release of the shaft 30 also allows the spring 52 to act to pull said shaft rearwardly to its limit of rearward movement, whenever the cam 53 clears the collar 51.

While so moving, the shaft is given a quarter-turn in order to shift the knife 36 to a position at right angles to the stalk A, so that said knife may effectively cut through said stalk, as shown in FIG. 4. This turning of the shaft is effected by the means shown in FIGS. 3, 4, and 6. Such means comprises a pair of transversely spaced guide bars 60 extending lengthwise of and below the shaft 30 and in the main parallel thereto and providing a slot 61 therebetween. At their forward end the bars 60 are rigid with bearing 31, and at the other end said bars are secured on a collar 62 turnable on the shaft.

A radial pin 63 mounted in a collar 64 fixed on the shaft 30 rides in the slot 61; the slot-forming bars 60 at their end nearest the bearing 31 being deflected circumferentially of the shaft so that the slot 61 is likewise deflected through a 90 degree arc, as shown, from the normal straight alinement of the slot.

When the shaft 30 is fully retracted, the pins 63 is in said deflected portion of the slot and the knife 36 is in a vertical position. With the above described pin guiding arrangement, therefore, the knife is turned to a horizontal stalk cutting position almost as soon as the shaft 30 is released for rearward movement.

It should be noted that the knife is normally held in a vertical position so that it cannot possibly interfere with any stalks ahead and which have not yet been engaged by the gripping wheel 14. Also, the shaft is disposed at an upward slope from the knife so that said shaft and all parts thereon may be mounted well above the ground, while enabling the stalk to be cut through close to the ground, as shown in FIG. 4.

It is of course necessary that the shaft 30 be retracted to its initial position after each stalk cutting operation, and this is effected by the following mechanism:

Turnable on the shaft 30 just rearwardly of the fixed collar 64 is a block 65 on which a pawl 66 is pivotally mounted for movement in a vertical plane; this pawl projecting rearwardly and downwardly from its pivoted end and riding at its rear end on the bars 60. A pin 67 projects horizontally from block 65 and is guided in a slot 68 parallel to shaft 30 and formed between a pair of bars 69 extending between and connected to bearing 31 and collar 62 on one side thereof. The pawl 66 at its rear end includes an upwardly projecting tip 70.

Disposed above the shaft at points between the bearing 31 and collar 62 are longitudinally spaced, horizontal-axis sprockets 71 about which an endless chain 72 is trained; this chain carrying a plurality of lugs 73 projecting outwardly therefrom. One sprocket 71 is connected in driving relation to the engine 59 by a belt drive, indicated generally at 74 and arranged to constantly drive said sprocket and the chain 72 at a high speed. The one drive 74 actuates the corresponding sprockets of all the units of the group.

The lower run of the chain is parallel to the shaft, and the tip 70 of pawl 66 is arranged so that the lugs 73 of the chain clear said tip during the major portion of rearward movement of the shaft and said pawl.

As the pawl 66 approaches its rearmost position, however, said pawl rides on the upwardly sloping rear end portion 60a of the bars 60, as shown in FIG. 4. The pawl tip 70 is thus raised so that it is then in the path of the lugs 73 on the lower run of the chain, and which run is driven forwardly. As a result, as soon as the shaft reaches its rearmost position it is immediately pulled forward or retracted; the pawl tip remaining engaged with the lug, by reason of friction, until the chain turns upwardly about the forward sprocket and releases the pawl. By the time this occurs the collar 32 has been retracted sufficiently to enable the spring-pressed pawl to drop into its holding position behind said collar. At the same time the pawl 39 moves behind, or is in a position to engage, the collar 40 as the rod 41 is retracted following the release of the finger 47 from the cut stalk A.

Should the rod 41 and collar 40 still be advanced when the pawl 39 arrives at said position, the collar 40 can subsequently move over the pawl 39 to its initial position ahead of the same be reason of the upwardly yieldable mounting of the rod 41 ahead of said collar, as hereinbefore described.

It should be noted that all the features which control the movement of the shaft 30 are arranged so that said shaft will have a very fast and snappy action in both directions. This is necessary in order to enable the knife to be in position to cut through successive stalks, even though the latter may be spaced somewhat close to each other along the row.

The vertical adjustability of the machine enables the cutting level of the knife relative to the ground to be altered according to the height of the stalks above ground at the time of cutting, or to what average length the cut-off stalks should be.

It may also be noted that while the machine as shown herein is designed to take care of a single ridge only of asparagus, such machine may be made to straddle and operate on two or more ridges at the same time.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. An asparagus harvester comprising a frame arranged to straddle and to be moved along a row of asparagus stalks upstanding from the ground, a wheel mounted on the frame and including a rim disposed at the bottom a predetermined distance above ground level, means to rotate the wheel so that the rim moves at a linear speed substantially the same as that of the machine, the rim comprising a pair of resilient transversely alined separate rim members normally engaged with each other, means acting on the rim members to spread the same apart to provide a short circumferential opening as the rim approaches a bottom position with the advance of the machine and terminating short of such bottom position whereby any upstanding stalk in the path of the wheel will be received in the opening and will then be gripped by said rim members, and a knife on the machine arranged to cut through any gripped stalk at a level adjacent the ground; the wheel including laterally resilient spokes for each rim member and connected thereto on the outside, and said member spreading means comprises a circumferentially extending cam-strip unit between the spokes of the two rim members and engaging the adjacent spokes to deflect the same laterally out and form said rim opening, and a bar on which the cam strip unit is fixed projecting at one end through such opening and, exteriorly of the wheel, being connected to the frame.

2. An asparagus harvester comprising a frame arranged to straddle and to be moved along a row of asparagus stalks upstanding from the ground, a wheel mounted on the frame and including a rim disposed at the bottom a predetermined distance above ground level, means to rotate the wheel so that the rim moves at a linear speed substantially the same as that of the machine, means associated with the wheel to cause any stalk alined therewith to be engaged and gripped thereby as the machine advances, a knife mounted on the machine to cut through a gripped stalk adjacent ground level, means on the machine normally holding the knife in a vertical position, means tending to advance the knife to a transversely horizontal operating position, and means controlled by such gripped stalk to release the holding means.

3. An asparagus harvester comprising a frame arranged to straddle and to be moved along a row of asparagus stalks upstanding from the ground, a wheel mounted on the frame and including a rim disposed at the bottom a predetermined distance above ground level, means to rotate the wheel so that the rim moves at a linear speed substantially the same as that of the machine, means associated with the wheel to cause any stalk alined therewith to be engaged and gripped thereby as the machine advances, a knife mounted on the machine to cut through a gripped stalk adjacent ground level, means normally holding the knife retracted, means tending to advance the knife to an operating position, and means controlled by such gripped stalk to release the holding means; the knife being arranged to cut across the stalk in a direction lengthwise of the travel of the machine, and means on the machine maintaining the knife in a vertical plane lengthwise of the machine until said knife is advanced to a cutting position.

4. An asparagus harvester comprising a frame arranged to straddle and to be moved along a row of asparagus stalks upstanding from the ground, a wheel mounted on the frame and including a rim disposed at the bottom a predetermined distance above ground level, means to rotate the wheel so that the rim moves at a linear speed substantially the same as that of the machine, means associated with the wheel to cause any stalk alined therewith to be engaged and gripped thereby as the machine advances, a shaft extending lengthwise of the machine to one side of the wheel, a knife projecting radially from one end of the shaft for engagement with a gripped stalk to cut across and sever the same, bearings on the machine supporting the shaft and through which the shaft is movable, a spring to advance the shaft to cause the knife to cut through a gripped stalk, means including a machine-mounted pawl normally holding the shaft retracted and the spring loaded, a movable feeler finger to engage a gripped stalk from behind, and means between the finger and pawl to release the latter upon movement of the finger from its initial stalk engaging position.

5. A machine, as in claim 4, in which the shaft is mounted in front of the wheel and the gripped stalk.

6. A machine, as in claim 5, in which the shaft extends at an upward slope from its rear knife end.

7. A machine, as in claim 4, with means acting on the shaft to immediately return the same to its initial retracted position following a stalk cutting operation.

8. A machine, as in claim 4, in which the knife extends radially of the shaft, with means acting on the shaft to rotate the same as it advances to dispose the knife in a substantially horizontal plane transversely of the machine, and to shift the knife to a vertical position when the shaft is retracted.

9. A machine, as in claim 8, in which the last named means comprises a radial pin fixed on the shaft, and fixed guide means for the pin projecting lengthwise of the shaft and arranged to cause the shaft to be rotated through an arc of 90 degrees between the advanced and retracted positions of the shaft.

10. A structure, as in claim 7, in which the last named means comprises a continuously driven endless sprocket-mounted chain having one run parallel to and adjacent a portion of the shaft, said chain having lugs projecting therefrom in spaced relation therealong, a pawl pivotally mounted in connection with the shaft for longitudinal movement therewith, said pawl having an outer end projecting for frictional holding engagement with any lug on said one run, and means acting on the pawl to maintain such end of the pawl in a lug engaging position only when the shaft is in a fully advanced position.

11. An asparagus harvester comprising a frame arranged to straddle and to be moved along a row of asparagus stalks upstanding from the ground, a wheel mounted on the frame and including a rim disposed at the bottom a predetermined distance above ground level, means to rotate the wheel so that the rim moves at a linear speed substantially the same as that of the machine, means associated with the wheel to cause any stalk alined therewith to be engaged and gripped thereby as the machine advances, a knife, means mounting the knife on the machine for movement between vertical and transversely extending positions, means on the machine acting on the mounting means to normally hold the knife in a vertical position, means connected to the mounting means tending to move the knife to a transverse cutting position, and means on the machine controlled by such gripped stalk to release the holding means.

12. A structure, as in claim 2, with means on the machine functioning automatically subsequent to a cut being made to immediately return the knife to such vertical position.

13. In an asparagus harvesting machine, means to engage and grip a stalk as the machine advances, a knife to cut through a gripped stalk adjacent ground level and in a direction lengthwise of the machine, means mounting the knife for movement lengthwise of the machine between operative and inoperative positions and disposing the knife when in the latter position at a higher level than when in the operative position, a spring tending to move the knife to the operative position and through a cutting stroke, and means normally holding the knife in an inoperative position and the spring loaded; there being a movable feeler to engage the gripped stalk from behind, and means controlled by feeler movement to release the holding means.

References Cited in the file of this patent
UNITED STATES PATENTS

| | | |
|---|---|---|
| 2,581,119 | Matteoli | Jan. 1, 1952 |
| 2,690,043 | Marihart | Sept. 28, 1954 |
| 2,709,330 | Lafferty et al. | May 31, 1955 |
| 2,767,544 | Turkington | Oct. 23, 1956 |
| 2,791,878 | Kepner | May 14, 1957 |